United States Patent [19]

Garner

[11] 4,439,050

[45] Mar. 27, 1984

[54] ROTARY BIT BEARING SYSTEM

[75] Inventor: Lloyd L. Garner, Fort Worth, Tex.

[73] Assignee: Globe Oil Tools, Inc., Fort Worth, Tex.

[21] Appl. No.: 272,659

[22] Filed: Jun. 11, 1981

[51] Int. Cl.³ .............................................. F16C 17/04
[52] U.S. Cl. .............................. 384/100; 308/DIG. 4; 308/DIG. 8; 384/302
[58] Field of Search ................... 308/8.2, DIG. 4, 164, 308/237 R, 237 A, 240, DIG. 8; 175/371; 384/100, 302

[56] References Cited

U.S. PATENT DOCUMENTS

| | | | |
|---|---|---|---|
| 1,094,535 | 4/1914 | Cooper | 308/164 |
| 3,917,361 | 11/1975 | Murdoch | 308/DIG. 4 |
| 3,995,917 | 12/1976 | Quinlan | 308/8.2 |

*Primary Examiner*—Lenard A. Footland
*Attorney, Agent, or Firm*—Hubbard, Thurman, Turner & Tucker

[57] ABSTRACT

Discloses a rotary bit bearing system for each cutter cone of a bit including ball bearings rotatably supporting the cone around a leg journal, a lateral sleeve bearing rotatably supporting the cone including a freely rotatably cylindrical composite sleeve bearing mounted between an inner bearing face and an outer bearing face. The composite sleeve comprises a first cylindrical sleeve member, a second cylindrical sleeve member, and a spacer disc thrust member mounted in freely rotatable relation between the first and second sleeve members. Also includes a disc thrust bearing rotatably supporting the cone to withstand axial forces including an external disc bearing, an internal disc bearing, and an intermediate disc bearing mounted in freely rotatable relationship between the external and the internal disc bearing with the intermediate disc bearing means including radial guide means to radially guide the internal and the external disc bearing. All bearing surfaces may be provided with dissimilar metal in sliding contact.

10 Claims, 5 Drawing Figures

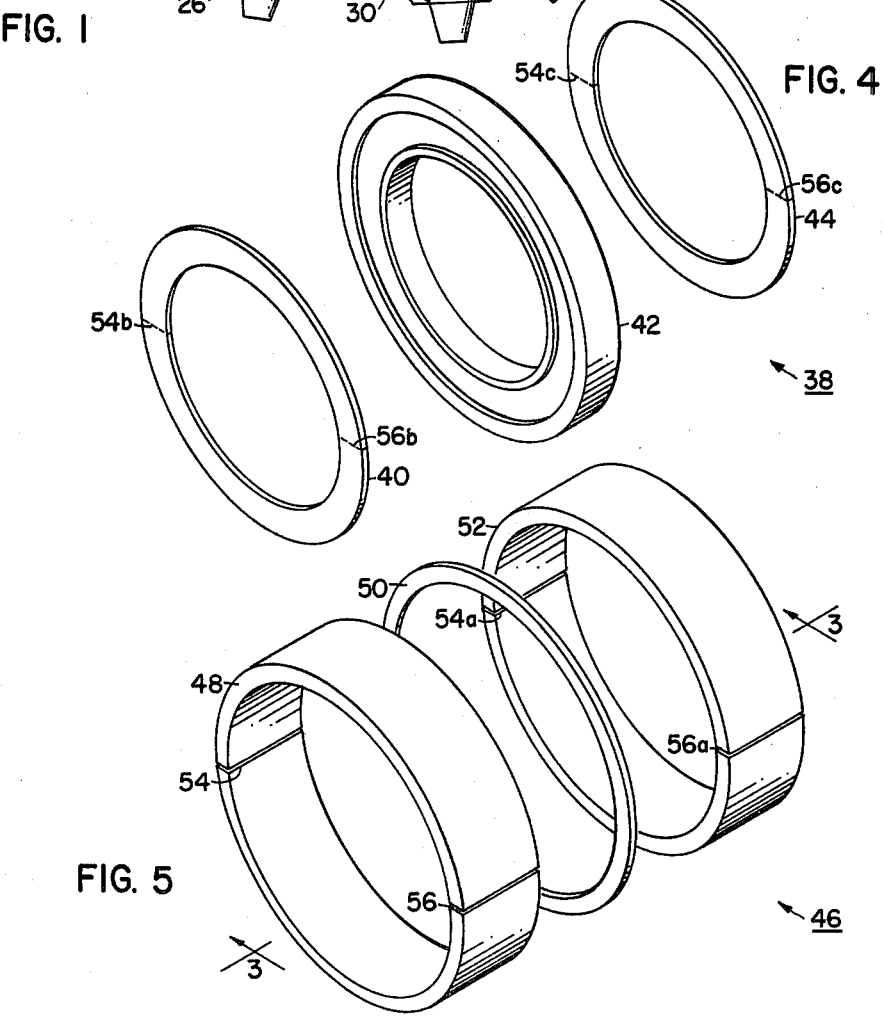

ROTARY BIT BEARING SYSTEM

This invention generally pertains to rotary bits for drilling oil and gas wells and the like, and more particularly pertains to an improved bearing system for each cutter cone of a rotary drilling bit.

BACKGROUND OF THE INVENTION

The bearings of rotary drilling bits are of critical importance to the useful life of the bit. The bearings must have an extended life under conditions of lubricant over-heating, extreme shock loading, lubricant contamination, and abrasion. Lubricant overheating with charring and outgasing of the lubricant and the consequent bearing deterioration is a common problem.

The present invention eases the bearing problems by effectively reducing the velocity between sliding bearing members by selectively distributing the sliding contact of mating faces of such bearing members over a significantly greater area which is utilized as a particular portion of such area increases in temperature.

Specifically pertinent prior art to the present invention is not known. However, typical prior art is noted and referenced as follows:

U.S. Pat. No. 3,680,873 to Garner discloses an improved seal to prevent contamination of the bearing lubricant;

U.S. Pat. No. 3,995,917 to Quinlan discloses an improved bearing and bearing material comprising an aluminum bronze alloy with a particular heat treatment;

U.S. Pat. No. 4,067,406 to Garner includes the disclosure of providing increased journal bearing area to increase the life of extended insert cutters.

OBJECTS OF THE INVENTION

One object of the present invention is to provide a cone cutter bearing area which requires substantially less sliding velocity between bearing surfaces, and consequently less heat generation, in a cone cutter rotating at a designated velocity.

Another object of the present invention is to increase significantly and substantially the combined area of the thrust and lateral bearing area for a designated cone cutter with an attendant increase to its usual life under strenuous operating conditions.

Yet another object of the present invention is to provide bearing components suitable for convenient machining tolerances and relatively simple assembly.

SUMMARY OF THE INVENTION

The foregoing and other objects and advantages of the invention are attained by a bearing system which includes ball bearing means rotatably supporting said cutter cone around a leg journal of said bit; a lateral sleeve bearing means rotatably supporting said cutter cone to withstand lateral forces including a freely rotatable cylindrical composite sleeve bearing means mounted between an inner cylindrical bearing face and an outer cylindrical bearing face. The composite sleeve comprises a first cylindrical sleeve member, and a spacer disc thrust member mounted in freely rotatable relation between the first and the second sleeve members and mounted to permit the sliding mating bearing surfaces within the lateral sleeve bearing means to have relative movement as a function of the friction co-efficient between said surfaces. A disc thrust bearing means rotatably supports the cutter cone to withstand axial forces including freely rotatable composite disc bearing means mounted between an external radial bearing face and an internal radial bearing face. The composite disc bearing means comprises an external disc bearing, an internal disc bearing, and an intermediate disc bearing mounted in freely rotatable relationship between said external and said internal disc bearing. The intermediate disc bearing means includes radial guide means to radially guide said internal and said external disc bearing and to radially guide said composite disc bearing, between said internal and said external radial faces. The composite disc bearing means is mounted to permit all sliding bearing surfaces in contact within said disc thrust bearing means to have relative sliding movement as a function of the friction co-efficient between said surfaces.

BRIEF DESCRIPTION OF THE DRAWING

FIG. 1 is an illustrative cross-sectional view of a cutter cone of the present invention taken along the axis of the cone and journal as assembled;

FIG. 2 is an illustrative enlarged sectional view of the composite thrust bearing located between the cutter cone and the bit journal;

FIG. 3 is an illustrative enlarged detailed view of the composite lateral bearing shown between the ball bearings and the seal in FIG. 1, and as seen along the line 3—3 in FIG. 5;

FIG. 4 is an illustrative exploded isometric view of the thrust bearing shown in FIGS. 1 and 2; and FIG. 5 is an illustrative exploded isometric view of the lateral bearing system shown in FIGS. 1 and 4.

DESCRIPTION OF THE PREFERRED EMBODIMENT

First referring to FIG. 1, there is shown one arm 10 of a rotary drilling bit which arm terminates at its lower end in a journal 12. A cutter cone 14 is mounted in rotatable relation about the journal 12. The cone 14 may have either milled teeth or insert teeth and may be one of two, or one of three, such cutter cones mounted to respective journals and arms of the rotary bit, depending on the design of the bit.

Beginning at the distal end of the journal 12, the journal is seen to be provided with a lateral bearing surface 16, a thrust bearing surface 18, a ball bearing race 20, a main lateral bearing surface 22, and a seal seating surface 24. The cutter cone 14 is seen to be provided with a lateral bearing surface 26 which is fitted in rotatable bearing relation with the bearing surface 16.

The lateral bearing surface 16 may be provided of a metal other than steel, for example an aluminum bronze alloy, to provide a dissimilar bearing surface for the corresponding bearing face in the cutter cone as later described. As is well known, dissimilar metals in sliding contact in bearings reduce the tendency to wear and galling as well as to provide a lower frictional co-efficient.

Cutter cone 16 also defines a thrust bearing surface 28 counter bored into the cone, a ball bearing race 30 which is complimentary to the ball bearing race 20, a lateral bearing surface 32 which is complimentary to the bearing surface 22, and seal seating surfaces 34 which compliment the seal seating surfaces 24 to accomodate a sealing element 36 as shown. The sealing element 36 may be any such as presently in commercial use which will operate properly in the space provided by seating surfaces 24 and 34.

Mounted in thrust supporting relationship between the thrust bearing surfaces 18 and 28 is a composite thrust bearing 38, shown in more detail in FIGS. 2 and 3.

The composite thrust bearing 38, as shown in FIGS. 2 and 3, is made up of an external disc bearing element 40, an intermediate disc bearing element 42, and an inner disc bearing element 44. Each of the disc bearing elements 40, 42, and 44 are provided with thrust bearing surfaces for sliding contact with one another and with the thrust bearing surfaces 18 and 28 as shown.

As shown in FIG. 4, the disc bearings 40 and 44 may be divided as shown in dashed lines to provide a gap or slot 54b and 54c, 56b and 56c. The reason to provide these slots is, when the bearing is assembled as shown in FIG. 1, the slots are filled with lubricant and distribute the same to the bearing surfaces 28 and 38.

As previously mentioned, dissimilar bearing materials are advantageously provided for contacting bearing surfaces. In the instance of the composite thrust bearing assembly 38, the external disc bearing 40 and the inner disc bearing 44 are advantageously provided of a softer metal, such as a brass or bronze alloy, for respective contact with the faces of the intermediate disc bearing 42 and the bearing surfaces 18 and 28 which will be provided of a steel alloy.

A composite lateral bearing assembly 46 is best shown in FIGS. 1, 3, and 5. The composite bearing 46 is comprised of an outer sleeve bearing 48, and intermediate spacer bearing 50, and an inner sleeve bearing 52.

The spacer bearing 50 is of disc shape and formed to have a thickness of about 0.020 to 0.025 inches, for example, and to be a few thousanths less than the OD and a few thousanths greater than the ID of the sleeve bearings 48 and 52. Thus, when assembled as shown in FIG. 3, the spacer bearing 50 may turn without interference with the bearing surfaces 22 and 32 when the bearing 46 is installed as shown in FIG. 1.

As shown in FIG. 5, the sleeve bearings 48 and 52 are preferably divided as shown to provide gaps or slots 54a and 54, 56a and 56. There are two reasons to provide the slots 54 and 56; one reason being, that when the bearing is assembled as shown in FIG. 1, the slots 54, 54a, 56a and 56 are filled with lubricant and distribute the same to the bearing surfaces 22 and 32; and the other reason being that the bearings 48 and 52 may be machined to meet the overall OD and ID of the cylindrical bearing surfaces 22 and 32 with rather loose tolerance and with the thickness of the sleeve between the OD and the ID being of closer tolerance. The sleeve is then divided and rather closely fit within the space between the bearing surfaces 22 and 32 when the bearing is installed as shown in FIG. 1.

When the bit cutter cone is assembled as shown in FIG. 1, the journal 12 is fitted at its end with a bearing to form the lateral bearing surface 16. The composite bearing 46 is mounted about the bearing surface 22 and the composite thrust bearing 38 is assembled and mounted against the surface of bearing surface 18 as shown. With the composite bearings 38 and 46 next positioned as shown, the cutter cone 14 is slipped over the journal 12 with the sealing element 36 previously installed.

A prescribed number of bearing balls 58 are then inserted into the circular cavity formed between the bearing races 20 and 30 through a bore 60 defined transversely through the arm 10 and journal 12 as shown. After the bearing balls 58 have been installed between the races 20 and 30 as shown, the balls are retained into a running position by a retainer plug 62 which is inserted into the bore 60 and retained in proper position by means of a weld 64, or the like.

The end of the retainer plug 62 is provided with a machined surface which provides a segment of the inner ball bearing race 20, as shown, and thus provides the race to be continuous. Also, as shown, the retainer plug 62 has been undercut intermediate its length to allow lubricant to come down through a passage 66, through the bore 60 and through a bore 68 which opens at the end of journal 12 into the space between the journal and the cutter cone 14 to provide lubricant for all of the bearings as described. A lubrication circulation system may be used such as disclosed in U.S. application Ser. No. 259,860, filed May 4, 1981, if desired.

OPERATION OF THE INVENTION

In operation, the cutter cone 14, the composite thrust bearing 38, the bearing balls 58, and the composite lateral bearing 46 are assembled as shown with the sealing element 36. The lubricant is injected through the passage 66 and bore 68 into the spaces remaining between the cutter cone 14 and the journal 12.

In normal operation, the rotary bit is rotated with very high axial loading imposed from above by drill collars (not shown) located above the bit. This axial loading is translated into thrust loading on the thrust bearing 38, and lateral loading on the lateral bearing 46. Such axial loading has superimposed thereon varying shock loadings as imposed by the teeth of the cutter cone 14 as such teeth engage the formation to chip the formation rock.

Referring first to thrust bearing 38, the bearing surface 18, the surfaces of disc bearing 40, the surfaces of disc bearing 42, the intermediate surfaces of thrust bearing 44, and the bearing surface 28 are all in intimate sliding contact as caused by rotation of the cutter cones.

Each of the disc bearings 40, 44, and 42 are free to rotate and would likely rotate between the surfaces 18 and 28 about an equal amount if all the mating sliding surfaces had the same friction co-efficient. However, in operation, some of the surfaces will slide slightly more readily than others, causing different ones of the disc 40, 42, and 44 to move responsive to the frictional drag between respective sliding surfaces.

The sliding surfaces which move the greatest amount will be expected to pick up more frictional heat than the surfaces sliding the lesser amount. When the surfaces sliding a greater amount begin to heat up, the friction co-efficient between these surfaces increase and thereby increase the drag between such surfaces. At some point, the surfaces previously moving at a slower rate will have a less friction co-efficient than the surfaces which have heated. At that time, the slower sliding surfaces will begin sliding more while the heated surfaces slow down, they begin to cool off and the friction co-efficient thereby drops while the more rapidly moving surfaces at some other place have been moving faster. The faster sliding surfaces in turn heat up and the surfaces which have cooled off begin to move again. Thus, through various cycles, all the surfaces between the surface 18 and the surface 28 have relative movement at one time or another and thus distribute the relative movement between the bearings and any consequent bearing wear over a much greater bearing area.

The composite lateral bearing 46 is generally adapted to move freely between the surface 16 and the surface 32 depending on the frictional co-efficient between the sliding surfaces. Further, the outer sleeve bearing 48 may move independently of the inner sleeve bearing 52 and the intermediate spacer bearing 50 may move independent of the movement of either of the bearings 48 and 52. As previously described with reference to thrust bearing 38, the relative surfaces of this bearing assembly move in inverse relationship to the frictional co-efficient between the surfaces. As one mating set of surfaces heat up, the friction co-efficient increases with corresponding drag, and then other surfaces take up the movement. The cycle of heating and cooling with movement between such various surfaces carries on all the time that the cutter cone 14 is being rotated.

It is to be noted that the composite lateral bearing 46 is mounted between bearing surfaces 22 and 32 such that the centers of the bearing balls 58 are located midway the thickness of bearing 46. As located, the balls 58 serve as a novel longitudinal bearing guide for bearing 46 and thereby provide more available surface area for bearing 46 and bearing surfaces 22 and 32.

As previously mentioned, it is considered to be the best design for sleeve bearings to have the sliding surfaces of dissimilar metal for more effective bearing properties. In the instance of the present invention, the lateral bearing surfaces 26 and thrust bearing surface 28 of the cutter cone 14 are of a steel alloy as is the cutter cone.

The bearing surface 16 may be of a dissimilar metal such as later described for the other bearing materials.

In the composite thrust bearing 38, the disc 40 and 44 may advantageously be provided of a dissimilar metal to the intermediate disc bearing 42 and the metal of the journal 12 and cutter cone 14.

For the bearing 46, the metal should also be provided to be dissimilar between sliding bearing surfaces. For example, the outer sleeve bearing 48 and inner sleeve bearing 52 may be of a bronze alloy while the disc thrust bearing 50 may be of steel.

It is pointed out that many of the bearing alloys of brass and bronze now commercially available may be used in the present invention. The aluminum bronze alloy as disclosed in the referenced U.S. Pat. No. 3,995,917 may also be used as desired.

Though only one embodiment of the present invention is herein disclosed, it will become readily apparent to those skilled in the art that various modifications and alterations may be made, all of which come within the purview of the appended claims.

I claim:

1. An improved bearing system for a cutter cone of a rotary bit comprising at least one sliding bearing means wherein said sliding bearing means rotatably supports said cutter cone to withstand lateral forces including an external cylindrical bearing face defined about said journal, an internal cylindrical bearing face defined within said cutting cone, and a freely rotatably cylindrical composite sleeve bearing means mounted between said internal cylindrical bearing face and said external cylindrical bearing surface, said composite sleeve comprising:
   (a) a first cylindrical sleeve member;
   (b) a second cylindrical sleeve member;
   (c) a spacer disc thrust member mounted in freely rotatable relation between said first and said second sleeve members; and
   (d) said composite sleeve being mounted to permit the sliding mating bearing surfaces within said lateral sleeve bearing means to have relative movement as a function of the friction co-efficient between said surfaces.

2. The bearing system of claim 1 wherein at least one of said first cylindrical sleeve member or said second cylindrical sleeve member are divided whereby a space is provided between the confronting ends of said first cylindrical sleeve member or said second cylindrical sleeve member.

3. The bearing system of claim 1 further including ball bearing means rotatably supporting said cutter cone around a leg journal of said bit including a group of ball bearings mounted to roll within an outer race defined around said journal and an inner race defined within said cutter cone.

4. The bearing system of claim 3 wherein said ball bearing means support said sliding bearing means in guiding relationship.

5. The system of claim 1 wherein said sliding bearing means includes a disc thrust bearing means rotatably supporting said cutter cone to withstand axial forces including an external radial bearing face defined about the axis of said journal, an internal radial bearing face defined within said cutter cone, and a freely rotatable composite disc bearing means mounted between said external radial bearing face and said internal radial bearing face, said composite disc bearing means comprising at least one disc thrust bearing member mounted in freely rotatable relation between said internal radial bearing face and said external radial bearing face.

6. The bearing system of claim 1 further including ball bearing means rotatably supporting said cutter cone around a leg journal of said bit and axially supporting said composite sleeve bearing means.

7. An improved bearing system for a cutter cone of a rotary bit comprising at least one sliding bearing means rotatably supporting said cutter cone to withstand external forces wherein said sliding bearing means includes a composite disc thrust bearing means rotatably supporting said cutter cone to withstand axial forces wherein an external radial bearing face is defined about the axis of said journal and an internal radial bearing face is defined within said cutter cone including:
   (a) a freely rotatable external disc bearing;
   (b) a freely rotatable internal disc bearing;
   (c) an intermediate disc bearing mounted in freely rotatable relationship between said external and said internal disc bearings, said intermediate bearing means including radial guide means to radially guide said internal and said external disc bearing and to radially guide said composite disc bearing between said internal and said external radial faces; and
   (d) said composite disc bearing means being mounted to permit all sliding bearing surfaces in contact within said disc thrust bearing means to have relative sliding movement as a function of the friction coefficient between said surfaces.

8. The bearing system of claim 7 wherein at least one of said external disc bearing or said internal disc bearing are divided whereby a space is provided between the confronting ends of said external disc bearing or said internal disc bearing.

9. An improved bearing system for a cutter cone of a rotary bit, comprising:

(a) at least one sliding bearing means rotatably supporting said cutter cone to withstand external forces including a first bearing face defined by the bit journal, a second bearing face defined within said cutter cone, and a freely rotatable composite bearing means mounted in sliding relation between said first bearing face and said second bearing face, said composite bearing means comprising:
  (1) a first slidable member;
  (2) a second slidable bearing member; and
  (3) an intermediate slidable bearing member mounted in freely rotatable sliding relation between said first and said second bearing members;
(b) said rotatable composite bearing means being mounted to permit the sliding bearing surfaces of said bearing members within said sliding bearing means to have relative movement as a function of the friction co-efficient between said surfaces; and wherein all sliding surfaces are provided with dissimilar metal in sliding contact.

10. An improved bearing system for a cutter cone of a rotary bit comprising a composite disc thrust bearing means rotatably supporting said cutter cone to withstand axial forces wherein an external radial bearing face is defined about the axis of said journal and an internal radial bearing face is defined within said cutter cone including:
  (a) a freely rotatable external disc bearing;
  (b) a freely rotatable internal disc bearing;
  (c) an intermediate disc bearing mounted in freely rotatable relationship between said external disc bearing and said internal disc bearing; and
  (d) said composite disc bearing means being mounted to permit all sliding bearing surfaces in contact within said disc thrust bearing means to have relative sliding movement as a function of the friction coefficient between said surfaces.

* * * * *